United States Patent
Wright, Jr. et al.

(10) Patent No.: US 7,136,885 B2
(45) Date of Patent: Nov. 14, 2006

(54) FREE SPACE MANAGEMENT

(75) Inventors: Cornell G. Wright, Jr., Austin, TX (US); Cornell G. Wright, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/327,151

(22) Filed: Dec. 20, 2002

(65) Prior Publication Data

US 2004/0122873 A1    Jun. 24, 2004

(51) Int. Cl.
*G06R 17/30* (2006.01)
(52) U.S. Cl. ...................................................... 707/205
(58) Field of Classification Search ........ 707/200–206, 707/1–10, 100–104.1; 714/4; 702/249; 713/201; 709/213; 717/101
See application file for complete search history.

(56) References Cited

U.S. PATENT DOCUMENTS

| | | | |
|---|---|---|---|
| 5,551,003 A | 8/1996 | Mattson et al. | |
| 5,909,540 A * | 6/1999 | Carter et al. | 714/4 |
| 6,023,744 A | 2/2000 | Shoroff et al. | |
| 6,523,027 B1 * | 2/2003 | Underwood | 707/4 |
| 6,609,128 B1 * | 8/2003 | Underwood | 707/10 |

* cited by examiner

*Primary Examiner*—Diane D. Mizrahi
(74) *Attorney, Agent, or Firm*—Duke W. Yee; Marilyn Smith Dawkins (57) ABSTRACT

An attribute is associated with one or more files stored on a storage medium, wherein the attribute is indicative to software utilized by a processor to access the files that the files are deletable. One or more files associated with the attribute can be deleted. Files can be deleted, for example, based upon receipt of a request for file system space. A sufficient amount of free space can be created to fulfill the request via the deletion of the one or more files associated with the attribute. A history of accesses to the files can be maintained and a least recently accessed file, associated with the attribute, can be deleted. Files can also be deleted according to a priority included in the attribute.

18 Claims, 6 Drawing Sheets

FREE SPACE MANAGEMENT

BACKGROUND

The present invention relates generally to an apparatus and method for managing files. In particular, the present invention relates to methods and systems that can associate an attribute with a file indicating whether the file can be considered automatically deletable by file system software such as provided by a given operating system.

The use of computers and other devices that utilize digital files, such as, for example, personal digital assistants, cellular devices and digital audio or video players, has proliferated. In order to increase performance and reliability, files may be gathered from a remote resource, such as a location over a network or a website, and stored locally. Often files that are stored locally can be recreated by accessing the original file, however local caching and similar techniques provide for smoother interaction with a user. Files may be discretionary for other reasons also, for example: an uncompressed back up copy of a file may be maintained for performance reasons, but not required if a compressed archived copy of the file exists; files may be available on another network resource; files may also be creatable via execution of a routine or program; or other reason for discretionary files. Management of network files can be time consuming to a system administrator. Tracking which files are recreatable and how efficiently the file can be recreated can be difficult.

The system administrator may need to take some action to free up space on a disk drive if, for example, a request is received for an amount of free space that exceeds an amount of free space currently available, or if the amount of free space available is regularly being utilized to the maximum.

Currently, a system administrator may need to manually view files and delete those files that the system administrator deems to be most expendable. The effectiveness of the system administrator's actions may be contingent upon the knowledge the system administrator has relating to the use of the file and potential for recreating the information contained within the file should the need arise. In the setting of a large system, or a system with complex interaction of files, it may be difficult for a human being to maintain optimum knowledge necessary to make such a determination.

In addition, even if the system administrator should be knowledgeable regarding all files involved, it can be inefficient and time consuming to manually manage free file space on a disk drive. A request for additional free file space may be received at an inconvenient time and must be responded to either with a denial of the request, or by making someone available to create the requested free file space.

Therefore, it would be advantageous to provide a method and apparatus that overcame the drawbacks of the prior art. In particular, it would be desirable to provide a method and apparatus that facilitates management of free file space.

SUMMARY

Accordingly, methods and systems for managing file system free space are disclosed. An attribute can be associated with one or more files stored on a storage medium, wherein the attribute is indicative to software utilized by a processor to access the files that the files are deletable. One or more files with which the attribute has been associated can be deleted.

Files can be deleted, for example, based upon receipt of a request for file system space. A determination can be made as to whether sufficient space is available on the storage medium to fulfill the request. A sufficient amount of free space can be created to fulfill the request via the deletion of the one or more files associated with the attribute. A request for additional file space can include, for example, one of: a) a request to store temporary files and b) a request to store intermediate results.

In addition, a history of accesses to the files can be maintained. The history can be utilized to determine a least recently accessed file with which the attribute has been associated. A least recently accessed file with which the attribute has been associated can be deleted in accordance with its least recently accessed status.

The software utilized by the processor to access the files can include, for example, one of: a) file system software and b) operating system software. The attribute indicating that a file is deletable can also be associated with a directory entry for one or more files, or with a directory or subdirectory.

In one aspect, files with the associated attribute indicating that the files are deletable can include a web browser cache. In addition, the attribute indicating a file is deletable can be automatically implemented by one of: a) application software, b) operating system software, c) file system software and d) user interaction with the processor.

A user interacting with the processor to implement association of the attribute with the one or more files can have write permissions to the one or more files.

In another aspect, the attribute indicating a file is deletable that is associated with the one or more files can also include an indication of a priority level for deletion.

In addition, a user associated with the file can be notified of pending deletion of the file, and an indication from the user affirming the deletion can be made.

Embodiments can also include a system for facilitating management of file system space. The system can include a storage medium for storing files and a processor operative with computer code for accessing the files stored on the storage medium. An attribute associated with one or more files can indicate to the computer code that the file is deletable.

Other embodiments can include a computer program product with computer executable program code residing on a computer-readable medium or a data signal implementing the inventive concepts of the present invention. The program code can include instructions for causing a computer to implement various aspects of the invention as described throughout the specification and claims.

Various features and embodiments are further described in the following figures, description and claims.

DETAILED DESCRIPTION

The present invention includes systems and methods for facilitating management of file space. In particular, systems and methods are disclosed for dynamically meeting requests for file space and also maximizing performance of a system accessing the files.

Figure 1:
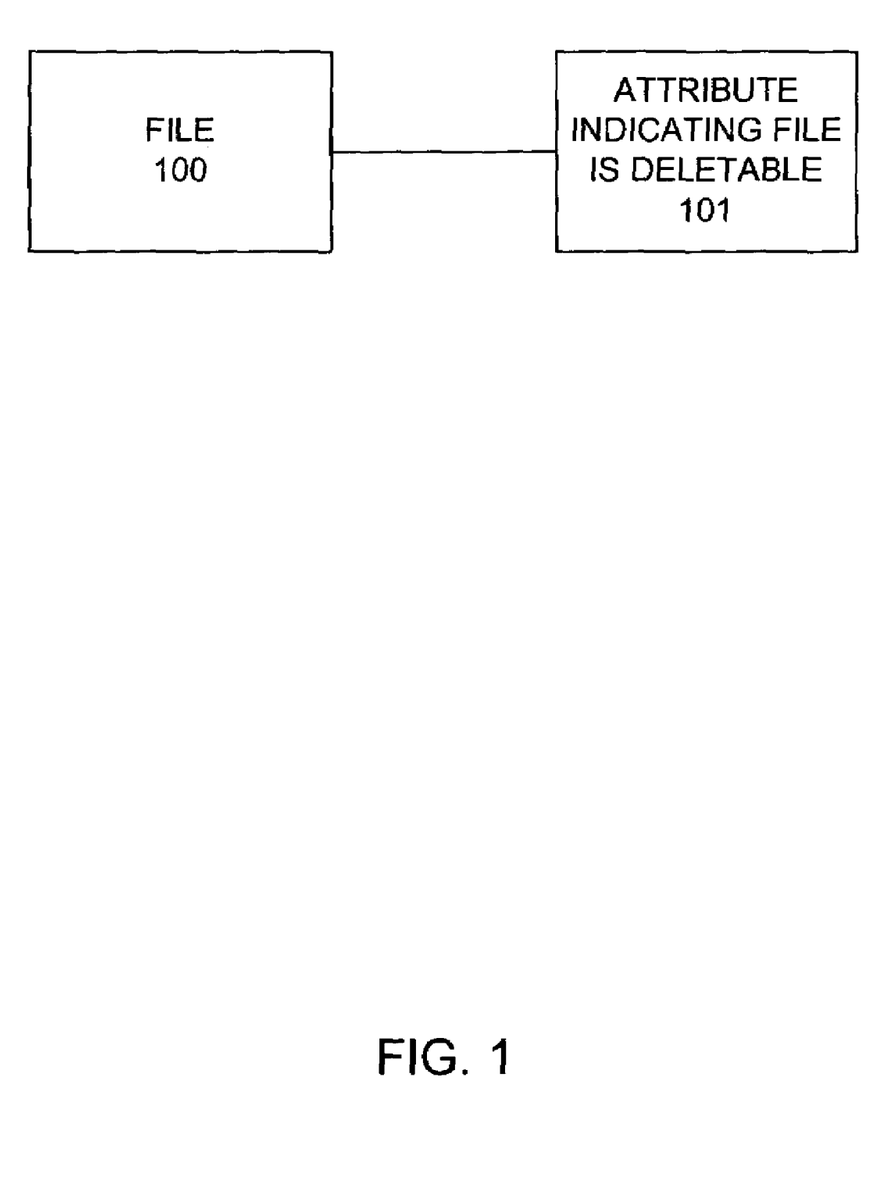
FIG. 1 illustrates a block diagram illustrating major components included in some exemplary embodiments of the invention.

Referring now to FIG. 1, a block diagram illustrating some embodiments of the present invention is provided. A file 100 can have an attribute 101 indicating the file 100 is deletable associated with it. The attribute 101 is indicative that the file is deletable. For example, the attribute 101 can indicate to software, such as operating system software or file system software; or to a user, such as a system administrator, that the file is deletable. For the purposes of this application, a file can include any collection of data that is treated by a system accessing the data as a unit capable of being input and output. A file can therefore include any directory entry, including a single file name, a group of file names, a sub-directory, a directory or other set or subset of data units.

The deletable attribute can be linked to the file data in any manner that makes it accessible. For example, the deletable attribute can be maintained with other attributes commonly maintained with the file, such as, for example, in a directory entry, with file permissions, or with other file management data. The attribute can comprise a single bit, a single digit alphanumeric character, a combination of characters, or other symbol or recognizable indicator capable of being read by software or a user accessing the file.

Figure 2:
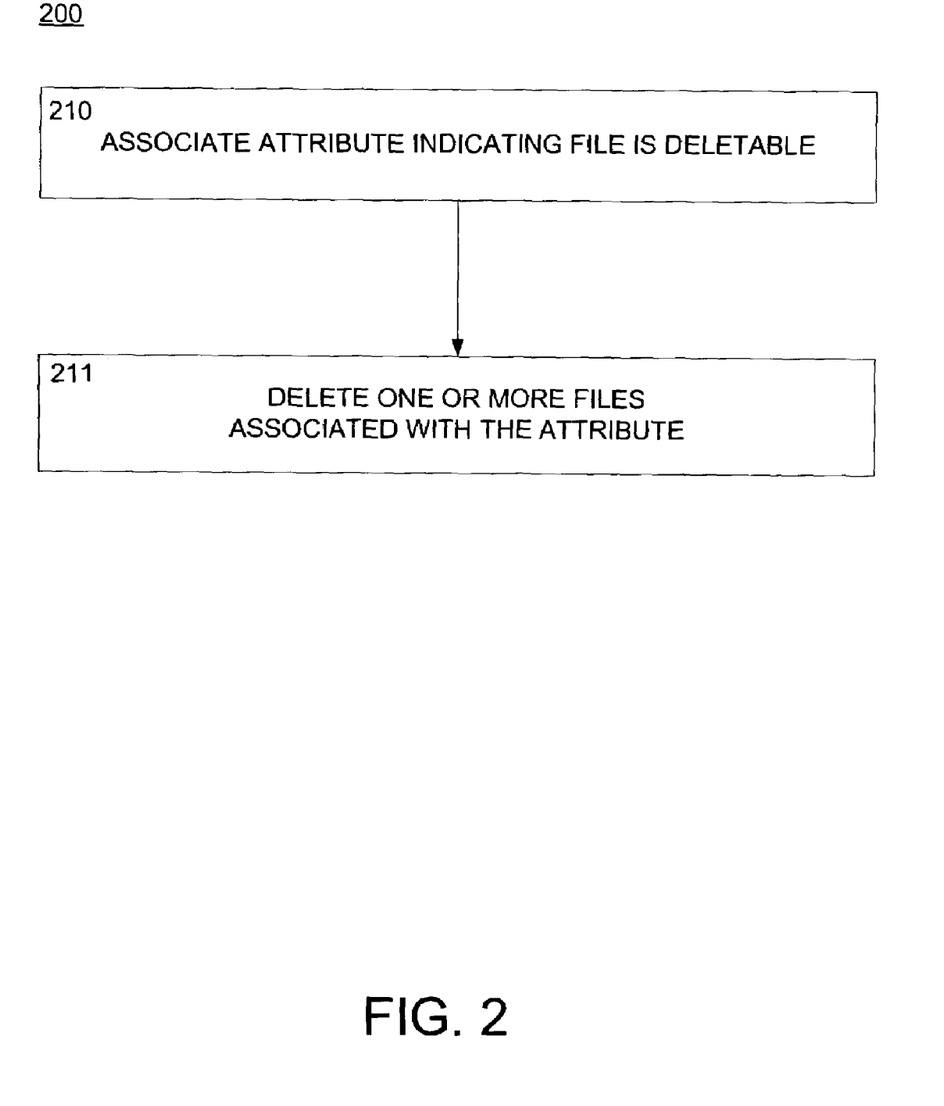
FIG. 2 illustrates a flow of exemplary steps that can be executed while implementing some embodiments of the present invention.
Figure 3:
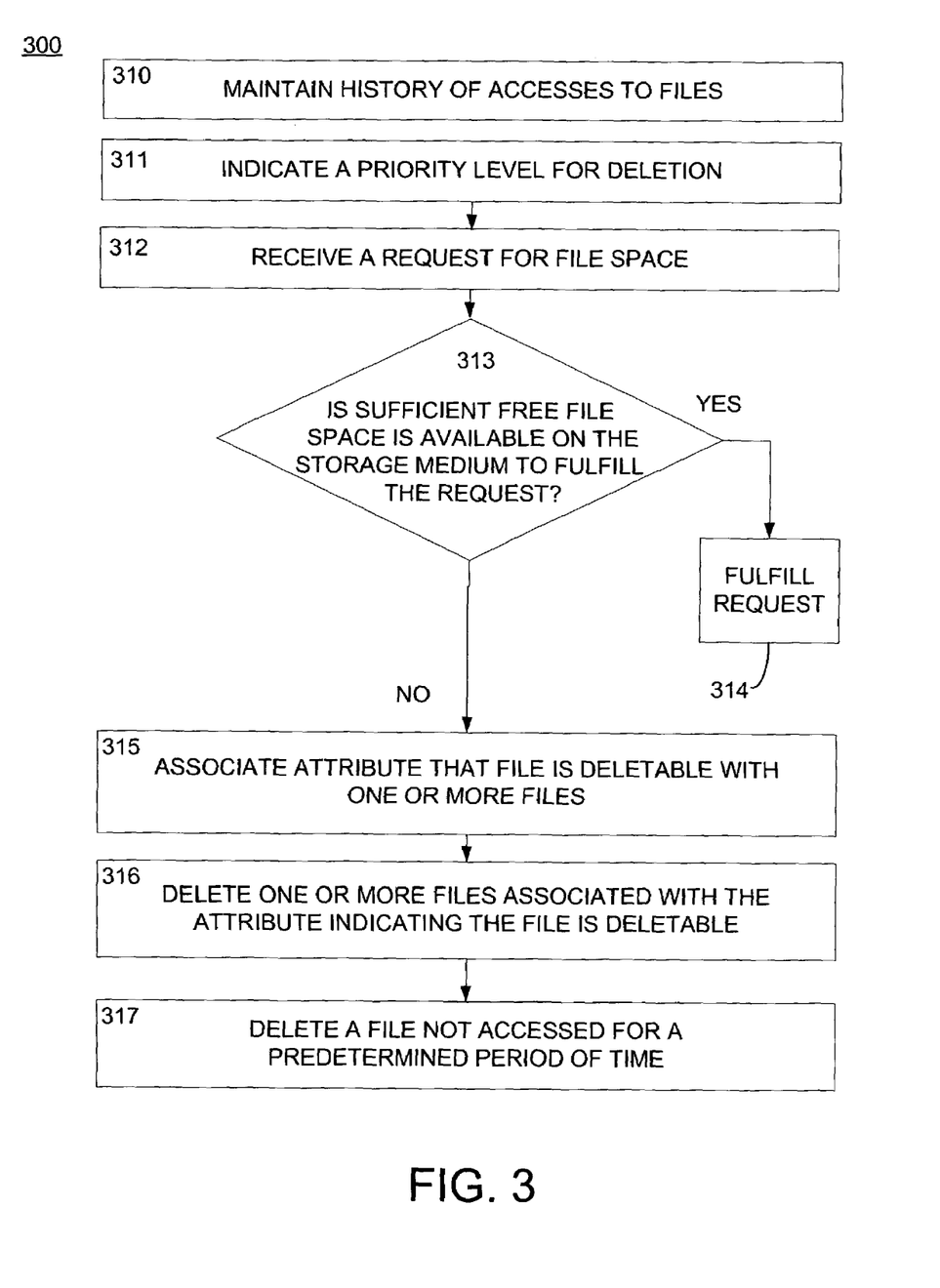
FIG. 3 illustrates a flow of additional exemplary steps that can be executed while implementing some embodiments of the present invention.

FIG. 2 illustrates basic steps that can be executed to implement the present invention. Any particular arrangement of steps included in this description, such as those steps in the flow charts in FIG. 2 and FIG. 3 are not meant to imply a fixed order to the steps; embodiments of the present invention can be practiced in any order that is practicable. At 210, an attribute indicating a file is deletable is associated with a file. The attribute 101 can be associated with the file 100 as the file is created or at some later time. Association can be accomplished by a user action, such as, for example, via a software command entered with a keyboard attached to a computer which can access the file 100, or via a software routine. A software routine can include for example: creation of a file utilized by a software application, such as a temporary file 100; a cache file 100; a file 100 saved by a user; a backup file 100, or other file type 100. In some embodiments, a default value for an attribute indicating a file is deletable 101 can be assigned as the file 100 is created and subsequently edited, or otherwise changed by a user or software program, such as application software, operating system software, or file system software.

As indicated above, a "file" 100 can include a directory, subdirectory or other group of file entries. Therefore, an entire directory or subdirectory can be marked for deletion by associating the directory or subdirectory with an attribute indicating the directory is deletable. If a directory is marked deletable, then that would indicate that the entire directory and all of its contents would be deletable, but only in its entirety.

At 211 one or more files 100 associated with the attribute are deleted based upon the attribute indicating that the file is deletable. Deletion can be based upon a demand for computer resources, on a periodic basis or responsive to some other condition.

In some embodiments, an operation to delete a file 100, or directory of files 100, can be executed as an atomic operation from the perspective of an application program. As such, associating a file with an indication that the file is deletable 101 and deletion of the files 100 marked with the association can be transparent to a user.

Referring now to FIG. 3, additional steps that can be implemented while practicing the present invention are illustrated. As stated above, any particular arrangement of steps included in this description is not meant to imply a fixed order to the steps; embodiments of the present invention can be practiced in any order that is practical. At 310 a history of accesses to files 100 can be maintained. The history of accesses can include for example, a chronology of dates and times of access to each file. At 311, in some embodiments, an attribute associated with a file and indicating that the file is deletable can include an indication of a priority level for deletion. The indication of priority level can, for example, be based upon: a user valuation, time since a last access to the file, a priority associated with an application that originated the file, a file type, or any other criteria.

At 312, a request for additional file space can also be received. The request can include, for example, a request to store permanent files, a request to store temporary files, a request to store intermediate results, or any other type of request for file space such as those well known in the software arts, such as a web browser cache. The request can be received, for example, by a server, personal computer, personal digital assistant, cellular telephone, or other processing system or apparatus.

At 313, the processing apparatus can determine if sufficient free file space is available on a storage medium involved to fulfill the request received. In some embodiments, a request may specify a particular storage medium, in other embodiments; a storage medium may be specified by software, a system administrator, or other entity. At 314, if sufficient free file space is available, the request can be fulfilled.

At 315, an attribute that a file 100 is deletable can be associated with one or more files 100. The attribute that the file is deletable 101 can be associated with a file 100 based upon a priority level, a time since a most recent access, or according to some other criteria. At 316, one or more files 100 associated with the attribute indicating that the file is deletable 101 can be deleted. In some embodiments, a number of files 100 to be deleted can be based upon freeing enough space to fulfill the request for file space. Accordingly, in some embodiments, deleted files 100, either alone or in combination, comprise enough file space to fulfill the request for file space.

At 317, a file 100 that has not been accessed for a predetermined period of time can be deleted. In some embodiments, the history of accesses to files 100 can be updated periodically and a determination made relating to an amount of time that has transpired since a last access for each file 100, based upon each update. Embodiments can include deleting files 100 that have not been accessed within the predetermined time, regardless of any requests for free file space. Other embodiments can include associating an attribute indicating that a file is deletable 101 with a file 100 that has not been accessed within a predetermined period of time and deleting files 100 associated with the attribute 101 in response to a request for free file space.

Access to a file 100 can include any utilization of a file 100, such as, for example: opening the file 100 for editing, viewing, reading or writing to; playing back an audio or video file 100; including the file 100 in a file management command, such as: a file copy, file move, file delete, or other action acting on a file 100; or any other action which changes the status of a file 100 from an available status to an unavailable status. For example, various operating systems and applications will utilize various mechanisms to indicate the status of a file 100, such as through a file status key or a file return code.

Figure 4:
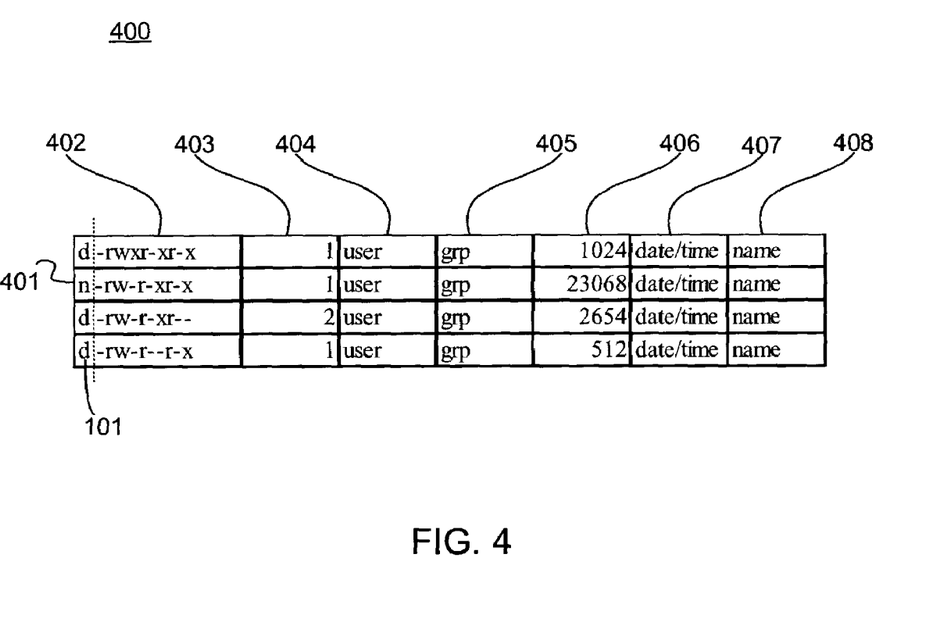
FIG. 4 illustrates a directory listing including an attribute indicating a deletable file according to some embodiments of the present invention.

Referring now to FIG. 4, an example of a directory of files 400 including an attribute indicating a deletable file 101 according to some embodiments of the present invention is illustrated. An attribute 401 associated with a file 100 can also indicate that a file 100 is not deletable. The attribute indicating that a file 100 is deletable 101 or not deletable 401 can be included along with other attributes 402, such as for example read/write attributes. The other items of information included in a directory 400 can include, for example, an indication of the number of current accesses 403, a user associated with the file 404, a group associated with the file 405, a size of the file 406, a date and time the file was last accessed 407 and a file name 408.

Figure 5:
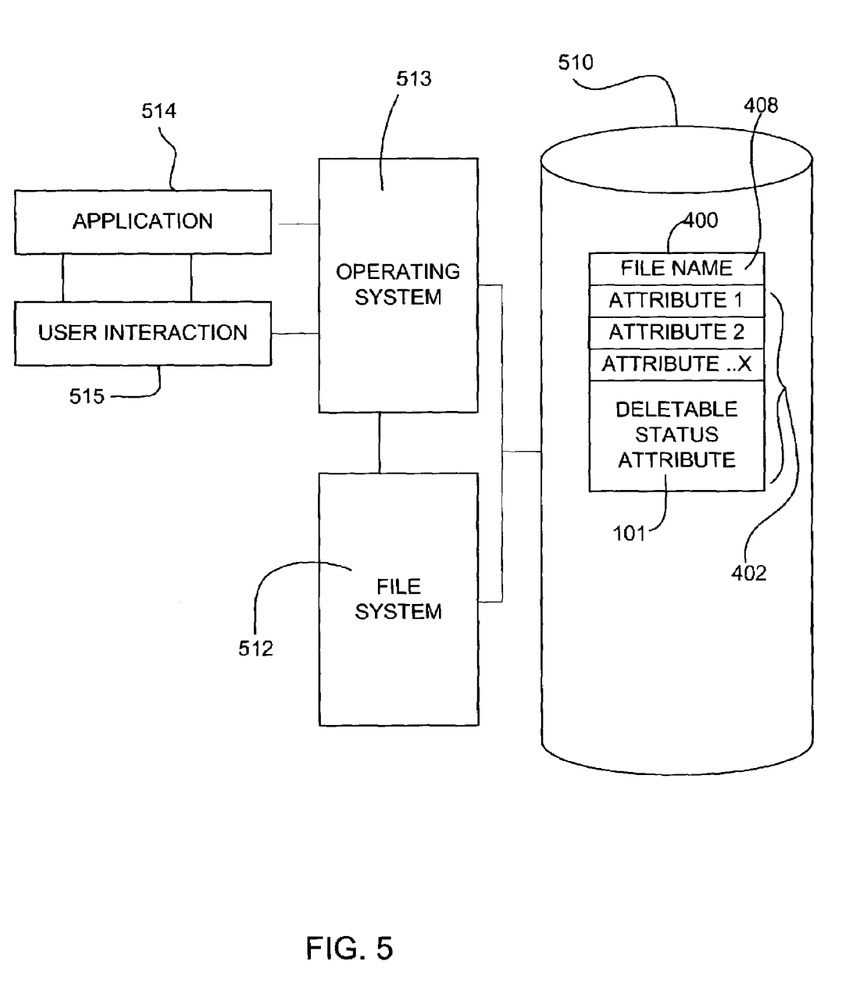
FIG. 5 illustrates a block diagram of exemplary items included in some embodiments of the present invention.

FIG. 5 illustrates a block diagram of various components that can interact while implementing the present invention. A directory of files 400, including the file name 400, various files attributes 402 and the attribute indicating the file is deletable 101 can be stored in a storage medium 510. The storage medium 510 can be accessed via software, including operating system software 513 and file system software 512. File system software 512 can include software for accessing one or more files 100. For example, File System software can include FAT, EXT2, or JFS.

Operating System software 513 can also be utilized to access files 100 and may also interact with application software 514 and user interaction software commands 515. Operating System software can include, for example AIX™, Linux™, IBM DOS™, OS/2™ or other operating system. Application software can include any software for interacting with a human operator, such as, for example, word processing, database, spreadsheet or special function software. Application software can also include software set in operation by a user to perform some function, such as, for example, anti-virus software or web access software.

Figure 6:
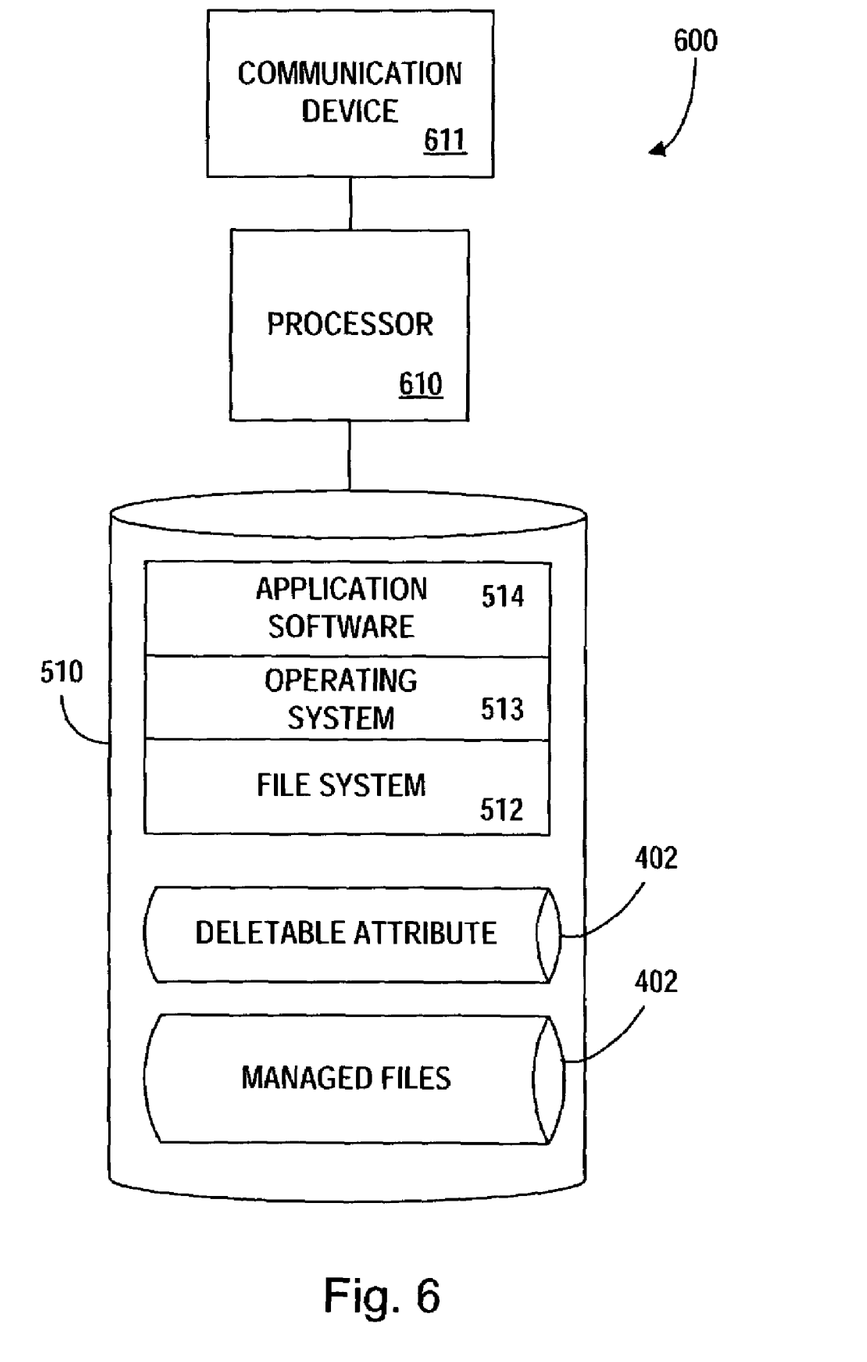
FIG. 6 illustrates a processing device that can be utilized in some embodiments of the present invention.

Referring now to FIG. 6, a block diagram of a controller 600 that can be utilized to implement some embodiments of the present invention is illustrated. The controller 600 can be operative with software, such as for example file system software 512, operating system software 513 or application software 514 to receive and fulfill requests for free file space and other aspects of the present invention. The controller 600 may include a processor 610, central processing unit, or computer that can receive a request for free file space. The request for free file space can be generated, for example, by software operative with the controller 600 or via a communication received on a communication device 611. A communication device 611 may include for example, a local area network adapter, a universal serial bus port, wireless communication circuitry, Bluetooth technology, etc.

In addition to the above, the controller 600 may include a memory or data storage medium 510 to store information, software, databases 401–402, communications or other information. The memory or data storage medium 510 preferably comprises an appropriate combination of magnetic, optical and/or semiconductor memory, and may include, for example, Random Read-Only Memory (ROM), Random Access Memory (RAM), a tape drive, flash memory, a floppy disk drive, a compact disc and/or a hard disk.

The controller 600 can be capable of high volume processing, performing a significant number of mathematical calculations in processing communications and database searches. The processor 600 also may comprise one or more microprocessors, computers, computer systems, etc.

Software may be resident and operating, or otherwise operational on the controller 600. The software may be stored on the data storage medium 510 and may include operating system software 513 or file system software 512 for controlling the processor 610, databases 401–402, etc. The operating system software 513 or file system software 512 may control the processor 610 to perform instructions in accordance with the present invention, and particularly in accordance with the methods described in detail herein. Appropriate program elements are known to those skilled in the art, and need not be described in detail herein.

According to some embodiments of the present invention, the instructions of the control program may be read into a main memory from another computer-readable medium, such as from ROM to RAM. Execution of sequences of the instructions in the control program causes the processor 610 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 610, communication device 611 and data storage medium 510 may communicate or be connected directly or indirectly in a variety of ways. For example, they may be connected via a bus. While specific implementations and hardware configurations for a controller 600 have been illustrated, it should be noted that other implementations and hardware configurations are possible and that no specific implementation or hardware configuration is needed.

In summary, there is a need to reserve sufficient file system free space on a computer to provide enough room for files that need to be created. However, this limits the amount of file system space that can be used for caches and other temporary files, and may require administrative attention. In response to this problem, a preferred embodiment described herein automatically manages free space while still allowing it to be used productively for caches and other temporary files. Automatic free space management is achieved, as described herein, through the use of an additional attribute added to a file and/or directory entry marking it as "deletable". When a request is made for additional file system space, if there is insufficient space available, then the operating system will automatically delete one or more of the files marked "deletable". This permits the file system space that would otherwise need to be maintained as free space to be used for temporary files for caches and intermediate results that can be recreated if necessary. To prevent in use files from being deleted, a "deletable" file would be ineligible for automatic deletion if it were locked or open.

As such, the files and/or directories having a deletable attribute can reside anywhere within the file system. The files that can be automatically deleted by the operating system do not have to reside in a specific directory, such as a /tmp directory for temporary files. Furthermore, the files marked as "deletable" can be automatically deleted as needed, thereby adding more flexibility and improved utilization of file system space over other systems that may delete files periodically from a given directory. In addition, the files marked as "deletable" remain in a usable state in a same way as though they were not marked as such.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. For example, some embodiments can include a files created with a default setting for an attribute indicating a file is deletable 101, such as a default indication that the file is deletable, or a default setting that the file is not deletable. In addition, a file may be held in a not deletable status so long as a predetermined condition exists and changed to a deletable status if the condition ceases to exist. For example, a file may be associated with an attribute that indicates that the file is not deletable while specific application software 514 is running and changed to an association with an attribute that indicates that the file is deletable when the application software 514 is closed. Embodiments can also include deletion of files associated with the attribute indicating the file is deletable 101 as part of disk maintenance, such as, a defragmenting routine or other routine. Accordingly, other embodiments are within the scope of the following claims.

What is claimed is:

1. A computer-implemented method of managing file system free space, comprising:
    associating an attribute with one or more files stored on a storage medium, wherein the attribute is indicative to software utilized by a processor to access the files that the files are deletable; and
    deleting one or more files associated with the attribute, it file system space is needed for other processing wherein the files with the associated attribute indicating that the files are deletable and comprise a web browser cache and notifying a user associated with the file of pending deletion of the file; and receiving an indication from the user affirming deletion of the file.

2. The method of claim 1 additionally comprising the steps of:
    receiving a request for file system space;
    determining if sufficient space is available on the storage medium to fulfill the request; and
    creating a sufficient amount of free space to fulfill the request via the deletion of the one or more files associated with the attribute.

3. The method of claim 2 wherein the request for additional file space comprises one of: a) a request to store temporary files and b) a request to store intermediate results.

4. The method of claim 1 wherein the steps of associating an attribute with one or more files stored on a storage medium and deleting one or more files associated with the attribute, are implemented by software routines internal to application software.

5. The method of claim 1 additionally comprising the steps of:
    maintaining a history of accesses to the files associated with the attribute; and
    deleting a least recently accessed file that is associated with the attribute indicating the file is deletable.

6. The method of claim 1 wherein the software utilized by the processor to access the files comprises one of: a) file system software and b) operating system software.

7. The method of claim 1 wherein the attribute is associated with a directory entry for the file.

8. The method of claim 1 wherein the association of the attribute with the one or more files stored on a storage medium is automatically implemented by one of: a) application software, b) operating system software, and c) file system software.

9. The method of claim 1 wherein user interaction with the processor implements association of the attribute with the one or more files stored on a storage medium.

10. The method of claim 9 wherein the user interacting with the processor to implement association of the attribute with the one or more files has write permissions to the one or more files.

11. The method of claim 1 wherein the one or more files associated with the attribute comprise a directory or subdirectory.

12. The method of claim 1 wherein the attribute associated with the one or more files further comprises an indication of a priority level for deletion.

13. A system for facilitating management of file system space, comprising:
    a storage medium for storing files;
    an attribute associated with one or more stored files wherein the attribute indicates to computer code that to file is deletable; and
    a processor operative with the computer code for accessing the files stored on the storage medium and for deleting one or more files associated with the attribute if file system space is needed for other processing wherein the files with the associated attribute indicating that the files are deletable and comprise a web browser cache and notifying a user associated with the file of pending deletion of the file; and receiving an indication from the user affirming deletion of the file.

14. The system of claim 13 wherein the storage medium is a magnetic disk drive.

15. The system of claim 13 wherein the storage medium and processor comprise one of: a) a server, b,) a personal computer, c) a personal digital assistant and d) a mobile communication device.

16. A computer program product in a computer readable storage medium for facilitating management of file system space, comprising:
    first instructions for associating an attribute with one or more files stored on a storage medium, wherein the attribute is indicative to software utilized by a processor to access the files that the files are deletable; and
    second instructions for deleting one or more files associated with the attribute if file system space is needed for other processing wherein the files with the associated attribute indicating that the files are deletable and comprise a web browser cache and notifying a user associated with the file of pending deletion of the file; and receiving an indication from the user affirming deletion of the file.

17. The computer program product of claim 16 additionally comprising:
    third instructions for receiving a request for file system space;
    fourth instructions for determining if sufficient space is available on the storage medium to fulfill the request; and
    fifth instructions for creating a sufficient amount of free space to fulfill the request via the deletion of the one or more files associated with the attribute.

18. The computer program product of claim 16 additionally comprising:
    third instructions for maintaining a history of accesses to the files; and
    fourth instructions for selecting a least recently used file for deletion.

* * * * *